United States Patent
Sekulovski et al.

(10) Patent No.: US 8,788,098 B2
(45) Date of Patent: Jul. 22, 2014

(54) STOCHASTIC DYNAMIC ATMOSPHERE

(75) Inventors: Dragan Sekulovski, Eindhoven (NL); Ramon Antoine Wiro Clout, Eindhoven (NL); Bram Kater, Eindhoven (NL); Therese Jacoba Maria Overbeek, Eindhoven (NL)

(73) Assignee: Koninklijke Philips N.V, Eindhoven (NL)

( * ) Notice: Subject to any disclaimer, the term of this patent is extended or adjusted under 35 U.S.C. 154(b) by 853 days.

(21) Appl. No.: 12/991,728

(22) PCT Filed: May 8, 2009

(86) PCT No.: PCT/IB2009/051909
§ 371 (c)(1),
(2), (4) Date: Nov. 9, 2010

(87) PCT Pub. No.: WO2009/138935
PCT Pub. Date: Nov. 19, 2009

(65) Prior Publication Data
US 2011/0057582 A1    Mar. 10, 2011

(30) Foreign Application Priority Data
May 13, 2008  (EP) ................................ 08156094

(51) Int. Cl.
*H05B 37/02*  (2006.01)
*G06N 5/02*  (2006.01)

(52) U.S. Cl.
USPC ........................................ 700/275; 315/312

(58) Field of Classification Search
USPC ......... 700/19, 275; 315/312, 363; 345/72, 83, 345/88; 706/52
See application file for complete search history.

(56) References Cited

U.S. PATENT DOCUMENTS

| | | | |
|---|---|---|---|
| 5,061,997 A | | 10/1991 | Rea et al. |
| 5,749,646 A | * | 5/1998 | Brittell .......................... 362/231 |
| 5,870,096 A | * | 2/1999 | Anjyo et al. ................... 345/426 |
| 5,924,784 A | | 7/1999 | Chliwnyj et al. |
| 6,166,496 A | | 12/2000 | Lys et al. |
| 6,211,626 B1 | | 4/2001 | Lys et al. |
| 6,433,483 B1 | * | 8/2002 | Michael et al. ................. 315/76 |
| 6,611,297 B1 | | 8/2003 | Akashi et al. |
| 6,888,322 B2 | | 5/2005 | Dowling et al. |

(Continued)

FOREIGN PATENT DOCUMENTS

WO    2007105134 A1    9/2007

OTHER PUBLICATIONS

Wikipedia: 9 Page Article on the Markov Chain, Downloaded From: http://en.wikipedia.org/wiki/Markov_chain, on October 14, 2008, 9 Page Document.

*Primary Examiner* — Charles Kasenge
(74) *Attorney, Agent, or Firm* — Yuliya Mathis

(57) ABSTRACT

The invention concerns a lighting device for creating dynamic atmospheres, the lighting device comprising: a light source adapted to operate in a plurality of color states, the light source emitting differing colors for each color state; a controller for controlling the color state of the light source; the controller comprising a random generator to provide a transition between a previous and a subsequent state, wherein the controller is adapted to provide the transition based on probabilistic output provided by the random generator implementing a stochastic model, the probabilistic output depending on the previous color state. In addition, a method is provided for generating the stochastic model; and a method for creating dynamic atmospheres based on probabilistic output provided by the stochastic model.

10 Claims, 4 Drawing Sheets

(56) References Cited

U.S. PATENT DOCUMENTS

| | | |
|---|---|---|
| 6,965,205 B2 | 11/2005 | Piepgras et al. |
| 7,038,398 B1 | 5/2006 | Lys et al. |
| 7,064,498 B2 | 6/2006 | Dowling et al. |
| 7,132,635 B2 | 11/2006 | Dowling |
| 7,228,190 B2 | 6/2007 | Dowling et al. |
| 7,248,239 B2 | 7/2007 | Dowling et al. |
| 7,495,671 B2 * | 2/2009 | Chemel et al. ............. 345/594 |
| 7,821,212 B2 * | 10/2010 | Wray ............. 315/312 |
| 7,889,999 B2 * | 2/2011 | Ann ............. 398/172 |
| 8,513,905 B2 * | 8/2013 | Julio ............. 315/312 |
| 2003/0161145 A1 | 8/2003 | Liu et al. |
| 2004/0042662 A1 * | 3/2004 | Wilensky et al. ............. 382/194 |
| 2005/0276955 A1 * | 12/2005 | Tooley ............. 428/195.1 |
| 2006/0221017 A1 * | 10/2006 | Fang ............. 345/83 |
| 2006/0233437 A1 | 10/2006 | Diehl |
| 2010/0149084 A1 * | 6/2010 | Chida ............. 345/102 |

\* cited by examiner

STOCHASTIC DYNAMIC ATMOSPHERE

FIELD OF INVENTION

The invention relates to a lighting device with changing colors for creating dynamic atmospheres, a system comprising a geometric arrangement of a plurality of coupled lighting devices, a device for generating a stochastic model for such a lighting device, a method for creating dynamic atmospheres, and a method for generating a stochastic model.

DESCRIPTION OF THE PRIOR ART

People have been listening to music for a long time for distraction and relaxation. More recently, alternative entertainment may be found in watching television or even more recently, watching movies on video or DVD. It is also known for quite some time that creating additional atmospheric effects, accompanying the audio or video entertainment source greatly enhances the user experience.

One way to create an additional atmosphere is to provide additional graphics, functionality present in most media players. Graphical effects are shown while listening to a song. These effects are generated on basis of the rhythm or the frequency (often represented by the Fast Fourier Transform (FFT) signal) of the song that is playing.

A more profound way to create an atmosphere is by generating light effects. An exemplary application hereof is a light organ. In a light organ, a number of colored lights are flashing on the rhythm or on the frequency of the music. These light effects are also directly derived from the song that is playing.

However, these light effects are unable to reflect natural atmospheres and light transitions as found in nature. Both methods have the disadvantage that similar input will provide similar effects. Therefore the effects will be predictable and repetitive. Another disadvantage is that creating the effects depends on playing the entertainment source. In the above methods, sometimes noise—e.g. from a (pseudo-)random generator—is added to the effects to make the effects look less repetitive and predictable. However, this is only a makeshift measure for camouflaging the drawbacks of the methods. It does not really make the effects unpredictable and natural. Another example of creating a natural atmosphere with light effects is by providing an extra illumination signal with the entertainment source. This is e.g. described in U.S. Pat. No. 6,166,496. Although this approach avoids scripting and therefore repetition and predictability may be avoided, other disadvantages are present. The first drawback is that a significant amount data needs to be stored and transported to the lighting device. Another disadvantage, as in the previous examples is that the additional effects can only be created in combination with the entertainment source. It is not possible to recreate an atmosphere without playing the entertainment source.

U.S. Pat. No. 6,611,297 teaches an illumination control step, wherein a level of a light color, intensity distribution or the like is calculated so that an appreciation space is made substantially coincident with the illumination impression. It thus uses real time image processing, in order to create a certain ambiance The publication is silent on implementing a stochastic model.

U.S. Pat. No. 5,924,784 implements a random model to simulate a flame by random light variations of LEDs. The model implements different waveforms to simulate plural forms of light.

SUMMARY OF THE INVENTION

In one aspect, the invention aims to provide a natural and unpredictable atmosphere. In another aspect, the invention regards autonomously creating dynamic atmospheres. The invention is defined by the independent claims. The dependent claims define advantageous embodiments. According to an aspect of the invention, a lighting device is provided for creating dynamic atmospheres, said lighting device comprising: a light source adapted to operate in a plurality of color states, the light source emitting differing colors for each color state; a controller for controlling the color state of the light source; the controller comprising a random generator to provide a transition between a previous and a subsequent state wherein the controller is adapted to provide the transition based on probabilistic output provided by the random generator implementing a stochastic model, the probabilistic output depending on the previous color state.

According to another aspect, a method for creating dynamic atmospheres is provided, the method comprising: operating a multimedial source in a plurality of states, each state associated with a perceptual differing atmosphere; and providing a transition between a previous and subsequent state, based on probabilistic output provided by a stochastic model, the probabilistic output depending on at least the previous state.

According to another aspect, a method is provided for generating a stochastic model, comprising: receiving multimedial input, clustering the multimedial input according to a predefined aspect; computing a statistic on subsequent transitions between the clusters; and generating probability parameters associated with the computed statistic so as to implement the stochastic model.

These and other aspects of the invention will be apparent from and elucidated with reference to the embodiments described hereinafter.

BRIEF DESCRIPTION OF THE DRAWINGS

The invention will be further elucidated in the figures.

DETAILED DESCRIPTION OF THE PRESENT INVENTION

Figure 1:
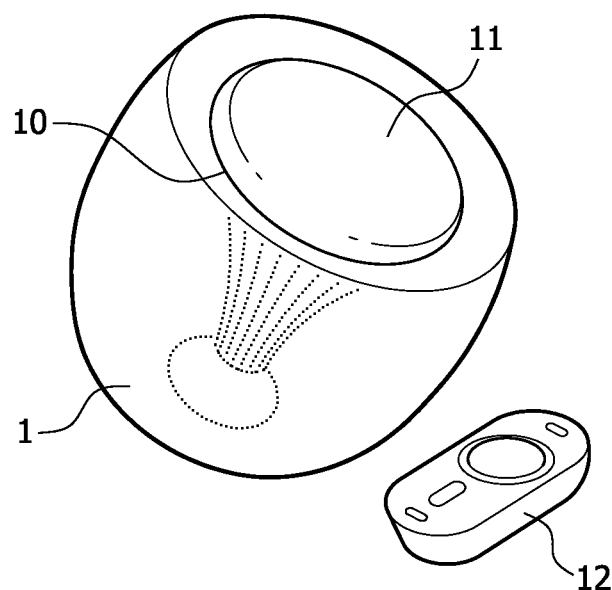
FIG. 1 shows a first embodiment according to the invention.
Figure 2:
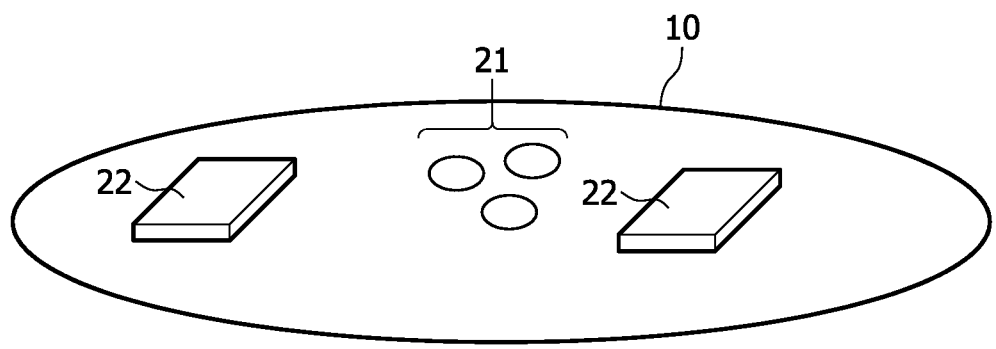
FIG. 2 shows a detail of the embodiment in FIG. 1.

Turning to FIG. 1, a schematic drawing is shown of a lighting device 1 for creating dynamic atmospheres, implementing an illuminator 11 housed on a mounting plate 10. The illuminator 11 comprises a controller 20 that controls the coloring of the device 1 according to an aspect of the invention. The controller 20 is provided, as can be seen in FIG. 2, on a mounting plate 10 (printed circuit board) housing essential circuitry for controlling a light source 21, in particular, as in this example, a plurality of sources of any RGB composition, such as: one or two red high brightness LED sources, a green and a blue source. Alternatively, other light sources, such as an incandescent light source may also be used, or any other multiprimary light source, or color temperature adjustable light source. More in particular, the light source 21 (in this example comprising an RGB triplet) is adapted to operate in a plurality of color states, wherein a color state is defined by the (composite) light source emitting a specific color. Thus, a color state may be defined by a specific CIE XYZ coordinate, or coordinated in any derived color space, e.g. an RGB combination. This defines the perceived coloring of the light, in addition to a controlled intensity of the respective RGB sources of the light source 21. Otherwise, the light source 21 may vary the radiated wavelength, to generate a specific color in the visible light spectrum.

To control the color state, controller 20 is provided, which can inter alia be programmed to drive the light source 21 to emit a specific coloring. In particular, the light source 21 can thus operate in different subsequent color states, that is, first, the light source 21 emits a first specific color, and, after a certain time, the light source 21 changes color under control of the controller 20.

The controller 20 may be preset by control parameters that may be preprogrammed, but, in a preferred embodiment, may also be uploaded, for example, as an added feature on a remote device 12, conventionally used for varying the color. In particular, the color states may be predefined and uploaded via a terminal or wireless data controller 22. In addition, other control parameters may be preprogrammed or uploadable. For example, the transition dynamics may be variable or presettable. Thus, a user can define the dynamic behavior between subsequent states, so that the state transitions can proceed in a pace and a manner that is desired or that fits a certain ambiance. The transition dynamics presetting circuitry may are also be part of the controller 20 as here depicted. In addition, the probabilistic parameters as further described hereinbelow may also be preprogrammed or uploadable via the data controller 22.

For defining spatial configurations based on a probabilistic model, to be explained further herein below, the data controller may also be used as a data link is adapted to communicate with other lighting devices and therefore light sources comprised in the other lighting devices.

Accordingly, where several lighting devices of the type illustrated in FIG. 1 are used, the lighting device 1 could also comprise detectors for detecting physical location with respect to neighboring lighting devices and the model and the processor/stochastic modeling means is arranged to co-operate with the model and the processor/stochastic modeling means of the neighboring lighting devices to provide the random/stochastic atmosphere.

Thus, by a negotiating mechanism, the devices 1 may communicate their respective states to each other or to a central control system, which may decide how the spatial and/or temporal dynamics of subsequent color states will evolve.

Herein, a temporal color transition will be defined as a change in color states of a color device that evolves over time. A spatial color transition will be defined as a change in color states between two spatially annexed devices, for example, in particular, in a system comprising a geometric arrangement (for instance: a matrix array or random clustered arrangement) of a plurality lighting devices, each having a specific color state. In may be appreciated, that the stochastic relations between timely and spatially annexed states may be controlled independently of each other, and one or both of them may be controlled by the probabilistic output provided by the random generator implementing the stochastic model. In particular, a 'previous state' may be understood in a spatial sense, in that a previous and a subsequent state may be formed by two annexed lighting devices.

In addition, the data link may be attached to communicate with other multimedial sources, such as audio, and or video sources. Thus, in addition to the color transitions, other perceptual ambiance transitions, such as audio sounds or imaging effects may be controlled by the inventive principle.

Figure 3:
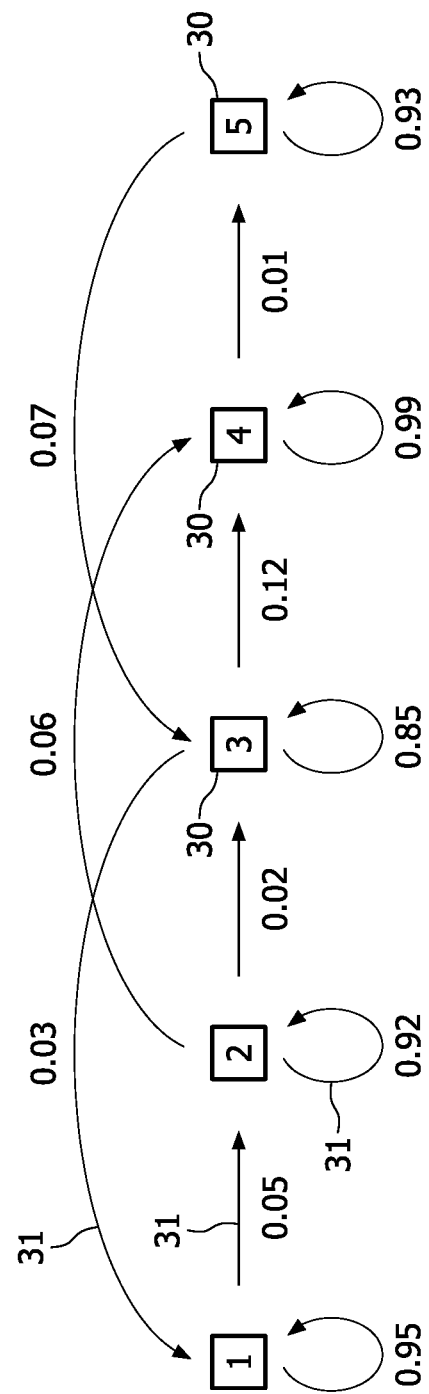
FIG. 3 shows a schematic example of a stochastic model implementing transitions between subsequent states.

FIG. 3 shows in more detail a schematic example of a stochastic model defining transitions between subsequent states (1)-(5), as implemented in the controller 20. To this end, the processor comprises a random generator (not shown). The output of this generator defines which transition between a previous and a subsequent state will take place. That is, based on the probabilistic outcome of the generator, and starting from a present state (which will become the previous state) the controller decides and controls which subsequent state (1)-(5) is realized, based on this present state. FIG. 3 implements a Markov type chain model that is a probabilistic/stochastic (instead of deterministic) process for describing transitions of a system from one state to another. However, the stochastic model is not limited to (purely) Markov type processes but could also be implementing other probabilistic models like probabilistic automata and Bayesian networks.

In this preferred example, given the present state, future states are independent on the past states. However, this dependency can also be added in a more generalized form. At each instant the system may change its state from the current state to another state, or remain in the same state, according to a certain probability distribution. The probabilities associated with various state-changes are termed transition probabilities.

A finite state machine may be used as a representation of a Markov chain. If the machine is in state x at time n, then there is a probability that it moves to state y at time n+1. However, this is not limited to temporal transitions, but could also apply to spatial transitions. Also, a combined temporal and spatial transition model can be applied, where, for instance a plurality of lighting devices, which may have a plurality of light sources, can be used in a predefined spatial configuration, each of which apply a color state that may have a spatial probabilistic correlation. A way to describe such relations is by means of Markov Random Fields known in the art. Thus, a probabilistic correlation may exist that neighboring lighting devices, and therefore light sources, are in predefined mutual states; wherein the terms previous and 'subsequent' are used in a generalized spatial context which may be defined by a nearest neighbor principle. In addition, a probabilistic correlation may exist that each light state will evolve, in a temporal manner from a previous to a subsequent state.

In FIG. 3, the nodes (30) represent the possible states of the system. Arrows (31) between nodes i and j represent the probability that the system changes from state i to j in a single time step.

In the exemplary state machine it can be seen that a system in state 1 at a time n, has a probability of 95% that the system continues to stay in state 1 at time n+1 and a probability of 5% that the system moves to state 2 at time n+1. Furthermore, the diagram shows that a system in state 3 at time n has a probability of 85% to continuing this state at n+1, a probability of 12% of moving to state 4 at time n+1 and a probability of 3% to state 1 at time n+1.

The probability parameters of a Markov chain model may also be represented in a transition probability matrix:

|   | 1 | 2 | ... | n |
|---|---|---|---|---|
| 1 | $p_{11}$ | $p_{12}$ | | $p_{1n}$ |
| 2 | $p_{21}$ | $p_{22}$ | | $p_{2n}$ |
| ... | | | | |
| N | $p_{n1}$ | $p_{n2}$ | | $p_{nn}$ |

Figure 4:
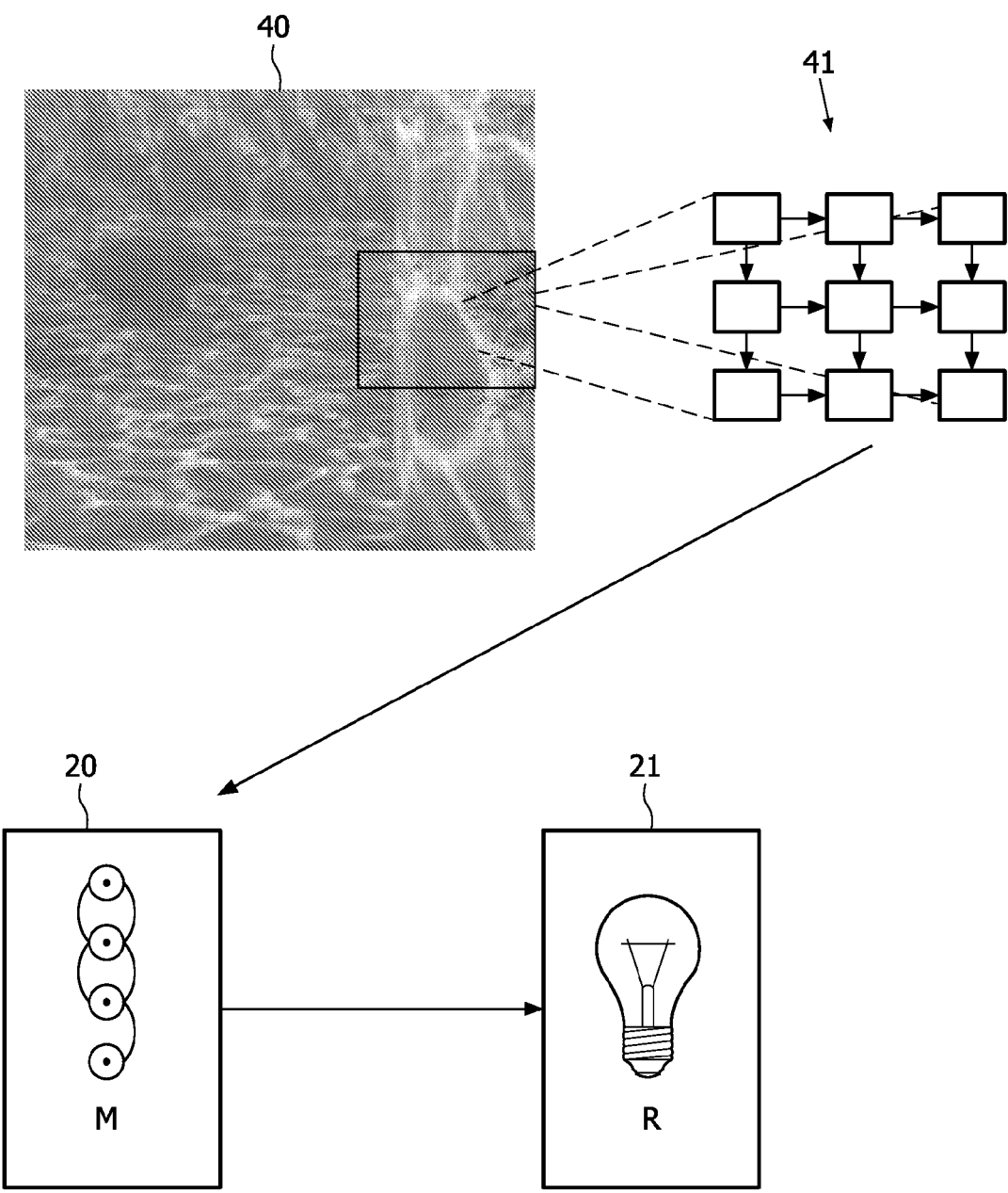
FIG. 4 shows schematic diagram of a method for generating a stochastic model according to the invention and of a method for creating dynamic based on the stochastic model.

FIG. 4 shows a schematic diagram of a method for generating a stochastic model according to the invention and of a method for creating dynamic based on the stochastic model. In this diagram, the parameters of the probability model, as implemented in controller 20 need to be determined, e.g. from a video source or an image 40 (as shown in FIG. 4) displaying natural (temporal and/or spatial) color transitions. Second, the model has to be loaded in the controller 20 of lighting device 1, where it has to be executed.

The modeling and rendering of arrangement of colors from image 40 is schematically indicated in subsequent model generating step 41. A rendering device 21 includes at least one light source that renders a sequence of colors based on the generated model.

The model generating step 41 will be described further in detail with reference to FIG. 5. First, it can be seen from FIG. 4, that the image is clustered in certain areas, each area defining a mean color weight. In another example, dynamic lighting effects, associated with temporal color transitions may be derived from video content of for example natural scenes, such as water, fire or scenery. Accordingly, a stochastic (Markov) model is generated from a temporal color distribution of a video source sequence; or from a spatial color distribution of an image. As a distance measure, delta E (CIE Lab), known in the art may be used. In addition, the smallest clusters of the color distribution are removed, and a centroid of each cluster can be used as node in the Markov chain.

Figure 5:
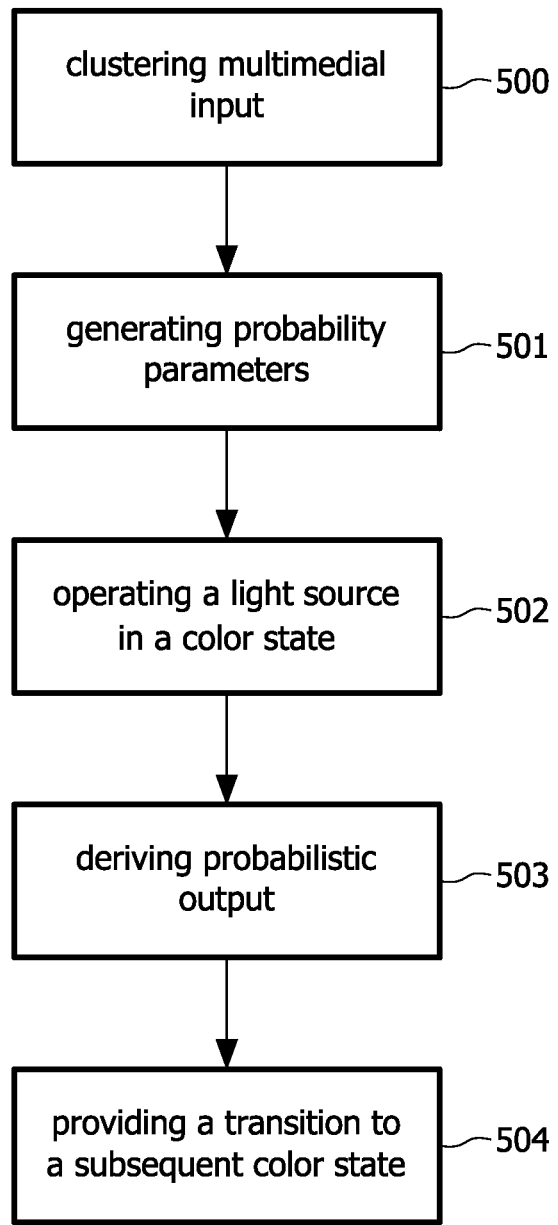
FIG. 5 shows subsequent steps according to an embodiment of the invention.

Accordingly, the step 501 in FIG. 5 wherein multimedial input is clustered according to a predefined aspect, such as color, chromaticity, lightness in one example, concerns:
1. Extracting representative color features (fi) from each frame $0 \leq i \leq m$ of the source video.

The extracted color features from every frame represent the overall color composition of the frame or the illumination color in the frame. As example features the mean color of the frame, the median and the trimean color can be used, as well as the lighting color estimate using for example the gray-world, the whitepatch or the PCA (principal component analysis) algorithm.
2. Reduce the number of colors by clustering the extracted colors (fi) into color classes (cj), $0 \leq j \leq n$ and substituting every color (fi) with its class representative (fi*). The variance in every class (Vj) is also learned.

Any general non-supervised clustering algorithm can be used to find the clusters of colors. In our example implementation, k-means clustering and blurring mean shift are used.
3. Taking the classes (cj) as states of the Markov Chain. The transition probabilities $p_{a,b}$, $0 \leq a, b \leq n$ of the Markov Chain are estimated in a step 502 using the observed transitions in the clustered source colors (fi*).

Another clustering aspect can be according to a time integral aspect, such as average color or sound level over a predetermined time.

Alternatively, the source material can be a static image. In this case, the transition probabilities are estimated from the neighborhood probabilities of states (color classes) and the speed of rendering is manually controlled.

Alternatively, the model can be manually crafted. A light design artist may manually 'VJ like' create the color states and the transition probabilities. For the latter there are several possibilities. A designer could only determine the probabilities between predetermined color states. Another possibility is to let the user determine both the colors (distribution) in the range and the probabilities for each state transition. This could be done with software on a computer and the resulting model may be transferred to the lighting device, for example, through downloading from a website.

The Markov model generated this way is then incorporated into a (standalone) lighting device which can autonomously render the random/stochastic atmospheres.

For the learning process of these models, the input is not limited to video and pictures, but may include audio, all kinds of sensors (pressure, temperature or physiological) or a combination of the above.

Rendering of color states according to the derived model:
Given the number of colors N and update frequency f, the model uses:
N2 numbers for the state transition probabilities
3N numbers for the RGB values for the colors
In terms of processing power:
f (pseudo) random numbers generated per second
f log(N) transition probability matrix look-ups per second
f operations of a filter per second in case of an embodiment in which the produced sequence of colors is filtered (for example by a low pass filter) to induce an additional desirable effect (like smoothness). The parameters of the filter can be user controlled or predefined.

Hence, for realistic N ($5 \leq N \leq 20$) and f ($25 \leq f \leq 50$), implementations are possible on very small processing platforms.

Step 503, wherein probabilistic output is derived from a model implementing a stochastic process, will be further explained based on an example. Suppose a model with 4 states and four state transitions. For example, the probabilities to stay in state 1, or go to states 2, 3 and 4 when in state 1 may be 0.7, 0.05. 0.1 and 0.15 respectively.
The probability of going to another state while in state 1:
Transition from S1 to

| S1 | 70% |
| S2 | 5% |
| S3 | 10% |
| S4 | 15% |

One possibility to map the random numbers on the transition is a linear search. This means that the random numbers between 0-0.7 will result in staying in the same state, random numbers between 0.7-0.75 will result in transition 2, 0.75-0.85 to transition 3 and 0.85-1 to transition 4.

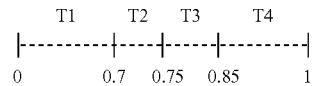

Of course the order of the transitions may be changed.
Accordingly, in step 504, the outcome of the model is used to generate a state transition to change the color state of the device.

The rendering of a model is a simple operation that only requires one random draw from a uniform [0, 1] distribution and a linear search per time interval at which the model is rendered (usually for models learned from video material at 25 Hz).

An alternative mapping method is binary search.

For a single light source, the rendering process was done by a random generator that picks the state transitions. For a Markov Random Field (MRF), a technique like Gibb's sampling can be used to generate a sequence of colors for all light devices.

The embodiments in this invention disclosure include lighting devices. The invention though is not limited to only light as output, but covers sound (soundscapes), smell, vibration and tactile output as additional modalities as well. It also covers a combination of these output modalities. More in particular, it may be understood that the invention also covers embodiments, without express indication to the contrary, of combined features as described here above. While the probabilistic output depends on the previous color state, it may depend on other things. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting device for creating dynamic atmospheres, said lighting device comprising:
    a light source adapted to operate in a plurality of color states, the light source emitting differing colors for each color state;
    a random generator;
    a controller for controlling the color state of the light source, the controller adapted to provide a transition between a previous and a subsequent color state based on a output provided by the random generator;
    a stochastic model defining transitions between subsequent states is implemented in the controller;
    wherein the controller is adapted to provide the transition between a previous and a subsequent color state such that, based on the outcome of the random generator and starting from a present color state, the controller is arranged to decide and control by the stochastic model which subsequent color state is realized based on the present color state;
    a multimedial output device driven by multimedial sources;
    a clustering circuit for clustering the multimedial output according to a predefined aspect;
    a computational circuit for computing a statistic on subsequent transitions between the clusters of the multimedial sources;
    a processing circuit for generating probability parameters associated with the computed statistic; and
    an output circuit for outputting the probability parameters to the random generator so as to implement the stochastic model.

2. The lighting device according to claim 1, wherein the transition regards a temporal color transition between previous and subsequent color states.

3. The lighting device according to claim 1, further comprising a presetting circuit, arranged to define a transition dynamic between a previous and a subsequent color state so that state transitions proceed according to the transition dynamic in a predefined manner.

4. The lighting device according to claim 1 further comprising a terminal for exchanging stochastic model parameters; transition dynamic parameters and/or color state parameters.

5. The lighting device according to claim 1, wherein the multimedial output devices are operable in response to a color state transition.

6. The system comprising a geometric arrangement of a plurality of coupled lighting devices according to claim 1.

7. A method for creating dynamic atmospheres, the method comprising:
    operating a light source in a plurality of color states,
    each color state of the light source associated with a perceptually differing atmosphere;
    providing, by a controller controlling the light source, a transition between a previous and subsequent color state, based on output provided by a random generator to the controller,
    implementing by the random generator a stochastic model,
    the stochastic model implemented by the random generator defining transitions between subsequent states implemented in the controller
    wherein the controller is adapted to provide the transition between a previous and a subsequent color state such that, based on the outcome of the random generator, and starting from a present color state, the controller is arranged to decide and control by the stochastic model which of the subsequent color state is realized based on the present color state;
    receiving multimedial input;
    clustering the multimedial input according to a predefined aspect;
    computing a statistic on subsequent transitions between the clusters of the multimedial inputs; and
    generating probability parameters associated with the computed statistic so as to implement the stochastic model.

8. The method according to claim 7, wherein the parameters of the stochastic model are extracted from a temporal color distribution of a video source sequence.

9. The method according to claim 7, wherein the parameters of the stochastic model are extracted from a spatial color distribution of an image.

10. A lighting device for creating dynamic atmospheres, said lighting device comprising:
    a light source adapted to operate in a plurality of color states, the light source emitting differing colors for each color state;
    a random generator;
    a controller for controlling the color state of the light source, the controller adapted to provide a transition between a previous and a subsequent color state based on a output provided by the random generator;
    a stochastic model defining transitions between subsequent states is implemented in the controller;
    wherein the controller is adapted to provide the transition between a previous and a subsequent color state such that, based on the outcome of the random generator and starting from a present color state, the controller is arranged to decide and control by the stochastic model which subsequent color state is realized based on the present color state;
    an input for receiving multimedial input;

the controller operable to
  cluster the multimedial input according to a predefined aspect;
  compute a statistic on subsequent transitions between the clusters;
  generate probability parameters associated with the computed statistic; and
  output the probability parameters so as to implement the stochastic model.

\* \* \* \* \*